(12) United States Patent
Deng et al.

(10) Patent No.: US 7,805,308 B2
(45) Date of Patent: Sep. 28, 2010

(54) HIDDEN TRAJECTORY MODELING WITH DIFFERENTIAL CEPSTRA FOR SPEECH RECOGNITION

(75) Inventors: Li Deng, Sammamish, WA (US); Dong Yu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 923 days.

(21) Appl. No.: 11/655,704

(22) Filed: Jan. 19, 2007

(65) Prior Publication Data

US 2008/0177546 A1 Jul. 24, 2008

(51) Int. Cl.
*G10L 13/02* (2006.01)

(52) U.S. Cl. ............... 704/261; 704/243; 704/256.5; 704/256.8; 704/255; 704/222

(58) Field of Classification Search ............. 704/256.5, 704/256, 243, 255, 261, 256.8, 240, 222, 704/254, 241, 270, 232, 209, 244
See application file for complete search history.

(56) References Cited

U.S. PATENT DOCUMENTS

| | | | | |
|---|---|---|---|---|
| 5,596,676 A * | 1/1997 | Swaminathan et al. | ...... | 704/208 |
| 5,734,789 A * | 3/1998 | Swaminathan et al. | ...... | 704/206 |
| 5,799,276 A * | 8/1998 | Komissarchik et al. | ...... | 704/251 |
| 5,890,111 A * | 3/1999 | Javkin et al. | ................ | 704/226 |
| 5,983,178 A * | 11/1999 | Naito et al. | .................. | 704/245 |
| 5,995,927 A | 11/1999 | Li | ............................... | 704/246 |
| 6,006,175 A * | 12/1999 | Holzrichter | ................. | 704/208 |
| 6,112,175 A * | 8/2000 | Chengalvarayan | ....... | 704/256.5 |
| 6,202,047 B1 | 3/2001 | Ephraim et al. | ............. | 704/256 |
| 6,418,412 B1 * | 7/2002 | Asghar et al. | ............. | 704/256.5 |
| 6,618,702 B1 | 9/2003 | Kohler et al. | ............... | 704/250 |
| 6,701,291 B2 * | 3/2004 | Li et al. | ...................... | 704/236 |
| 6,725,190 B1 | 4/2004 | Chazan et al. | .............. | 704/205 |
| 6,931,374 B2 | 8/2005 | Attias et al. | ............... | 704/240 |
| 6,999,928 B2 | 2/2006 | Wang et al. | ................. | 704/250 |
| 7,035,791 B2 | 4/2006 | Chazan et al. | ............. | 704/207 |
| 7,035,797 B2 * | 4/2006 | Iso-Sipila | ................... | 704/227 |

(Continued)

OTHER PUBLICATIONS

Li Deng, Xiaodong Cui, Robert Pruvenok, Jonathan Huang, Safiyy Momen, Yanyi Chen, and Abeer Alwan. "A database of vocal tract resonance trajectories for research in speech processing," Proceedings of the IEEE International Conference on Acoustics, Speech, and Signal Processing, May 14-19, 2006, Toulouse, France, pp. 60-63.

(Continued)

*Primary Examiner*—Vijay B Chawan
(74) *Attorney, Agent, or Firm*—Joseph R. Kelly; Westman, Champlin & Kelly, P.A.

(57) ABSTRACT

A novel system for speech recognition uses differential cepstra over time frames as acoustic features, together with the traditional static cepstral features, for hidden trajectory modeling, and provides greater accuracy and performance in automatic speech recognition. According to one illustrative embodiment, an automatic speech recognition method includes receiving a speech input, generating an interpretation of the speech, and providing an output based at least in part on the interpretation of the speech input. The interpretation of the speech uses hidden trajectory modeling with observation vectors that are based on cepstra and on differential cepstra derived from the cepstra. A method is developed that can automatically train the hidden trajectory model's parameters that are corresponding to the components of the differential cepstra in the full acoustic feature vectors.

16 Claims, 6 Drawing Sheets

U.S. PATENT DOCUMENTS

| | | | |
|---|---|---|---|
| 7,050,975 B2 * | 5/2006 | Deng et al. | 704/256.3 |
| 7,117,148 B2 | 10/2006 | Droppo et al. | 704/228 |
| 7,124,075 B2 * | 10/2006 | Terez | 704/203 |
| 7,379,868 B2 * | 5/2008 | Reynolds | 704/243 |
| 7,409,346 B2 * | 8/2008 | Acero et al. | 704/254 |
| 7,519,531 B2 * | 4/2009 | Acero et al. | 704/209 |
| 7,565,284 B2 * | 7/2009 | Deng et al. | 704/206 |
| 7,617,104 B2 * | 11/2009 | Deng et al. | 704/256.5 |
| 2002/0062211 A1 * | 5/2002 | Li et al. | 704/236 |
| 2003/0115054 A1 * | 6/2003 | Iso-Sipila | 704/233 |
| 2004/0019483 A1 * | 1/2004 | Deng et al. | 704/239 |
| 2004/0143435 A1 * | 7/2004 | Deng et al. | 704/256 |
| 2006/0004567 A1 * | 1/2006 | Russell | 704/209 |
| 2006/0053008 A1 * | 3/2006 | Droppo et al. | 704/234 |
| 2006/0200351 A1 * | 9/2006 | Acero et al. | 704/254 |
| 2006/0229875 A1 * | 10/2006 | Acero et al. | 704/261 |
| 2007/0198260 A1 * | 8/2007 | Deng et al. | 704/237 |

OTHER PUBLICATIONS

"Acoustic Modeling and EARS Research", Microsoft Research, 2003, http://research.microsoft.com/srg/acoustic-modeling.aspx.

L. Deng, X. Li, D. Yu, and, A. Acero. "Novel Acoustic Modeling with Structured Dynamics for Speech Coarticulation and Reduction," Proc. Of DARPA/NIST RT-04 Workshop, Palisades, New York, Nov. 7-10, 2004, 6 pages.

"Inclusion of Temporal Information into Features for Speech Recognition" by Ben Milner, Spoken Language, 1996, vol. 1, p. 256-259.

* cited by examiner

HIDDEN TRAJECTORY MODELING WITH DIFFERENTIAL CEPSTRA FOR SPEECH RECOGNITION

BACKGROUND

Improving the accuracy and performance of automatic speech recognition has been an active area of research. These have included modeling human speech using methods such as hidden Markov models and hidden trajectory models. For example, a statistical hidden trajectory model may use temporal filtering of hidden vocal tract resonance targets to estimate a hidden trajectory for a vocal tract resonance. The targets used in the hidden trajectory model are described as being stochastic with a phoneme-dependent probability distribution. Thus each phoneme has a mean target and a target variance. In the past, the mean target and the target variance have been determined using a vocal tract resonance tracker.

Using the tracker, hidden trajectory values for individual phonemes are collected and the statistical distribution of the vocal tract resonances is used to identify the means and variances for the targets. The vocal tract resonance tracker is prone to errors in the vocal tract resonances identified by the tracker, which are propagated into the target distributions. As a result, the target distributions are incorrect, sometimes resulting in undesirable performance of the hidden trajectory model. Also, the acoustic features such as cepstra used in the past are static, losing some useful information that can be provided by the "dynamic" or temporal-differential features.

The discussion above is merely provided for general background information and is not intended to be used as an aid in determining the scope of the claimed subject matter.

SUMMARY

A novel system for speech recognition uses static cepstra and differential cepstra over time frames as acoustic features for hidden trajectory modeling, and provides greater accuracy and performance in automatic speech recognition. According to one illustrative embodiment, an automatic speech recognition method includes receiving a speech input, generating an interpretation of the speech, and providing an output based at least in part on the interpretation of the speech input. The interpretation of the speech uses hidden trajectory modeling with observation vectors that are based on cepstra and on differential cepstra derived from the cepstra. A method is developed that can automatically train the hidden trajectory model's parameters that correspond to the components of the differential cepstra in the acoustic feature vectors.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
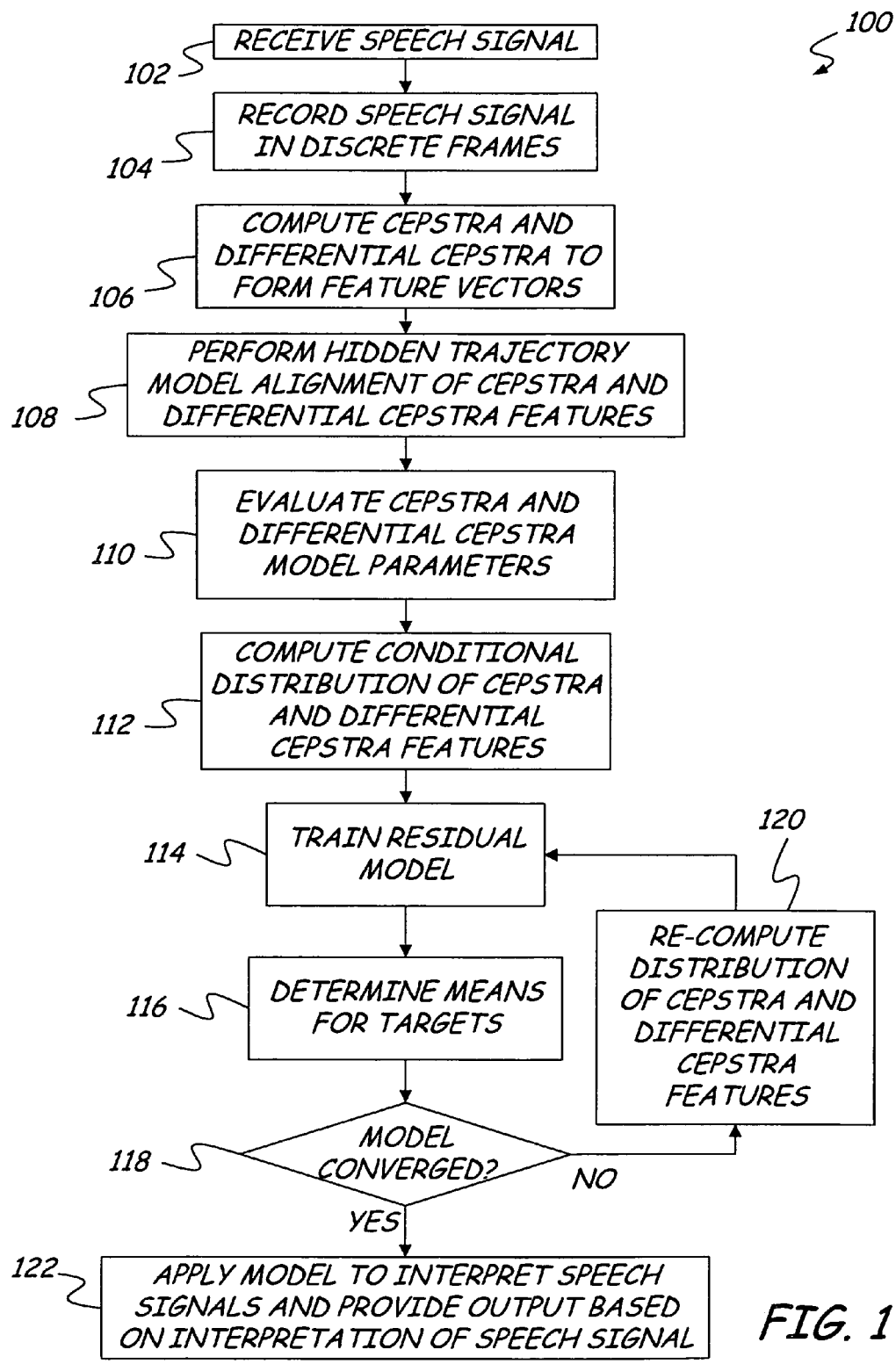
FIG. 1 depicts a flow diagram for a method for training a speech recognition system, according to an illustrative embodiment.

FIG. 1 depicts a flow diagram of an automatic speech recognition method 100 using hidden trajectory modeling with differential cepstra, according one illustrative embodiment. Some illustrative elements of a software system 200 used in the process depicted in FIG. 1, according one illustrative embodiment, are depicted in the block diagram of FIG. 2. FIG. 3 illustrates an example of sampling information from an acoustic signal in support of method 100. After the first three figures are introduced, additional details are provided on how hidden trajectory modeling may be performed with differential cepstra, according to an illustrative embodiment. Automatic speech recognition method 100 may be implemented in any of a wide variety of software and computing implementations, as will be familiar to those skilled in the art, and which are surveyed below with reference to FIGS. 4 and 5. Further details of various illustrative embodiments are provided below, which are illustrative and indicative of the broader meaning and variety associated with the disclosure and the claims provided herein.

Method 100 provides an illustrative way to train a hidden trajectory model using cepstra and time-ordered differential cepstra. This includes estimating mean target vocal tract resonance (VTR) vectors for a set of speech units such as phones, phonemes, syllables, or sentences, for example. A hidden trajectory model is a two-stage model that provides a probability of an observation vector given a speech unit such as a phoneme. In the first stage of the model, a probability distribution for vocal tract resonance (VTR) trajectories is described in terms of a filtered sequence of VTR target distributions. In the second stage of the hidden trajectory model, the probability of an observation vector is described in terms of a non-linear function of the vocal tract resonance trajectory and a residual model.

Figure 2:
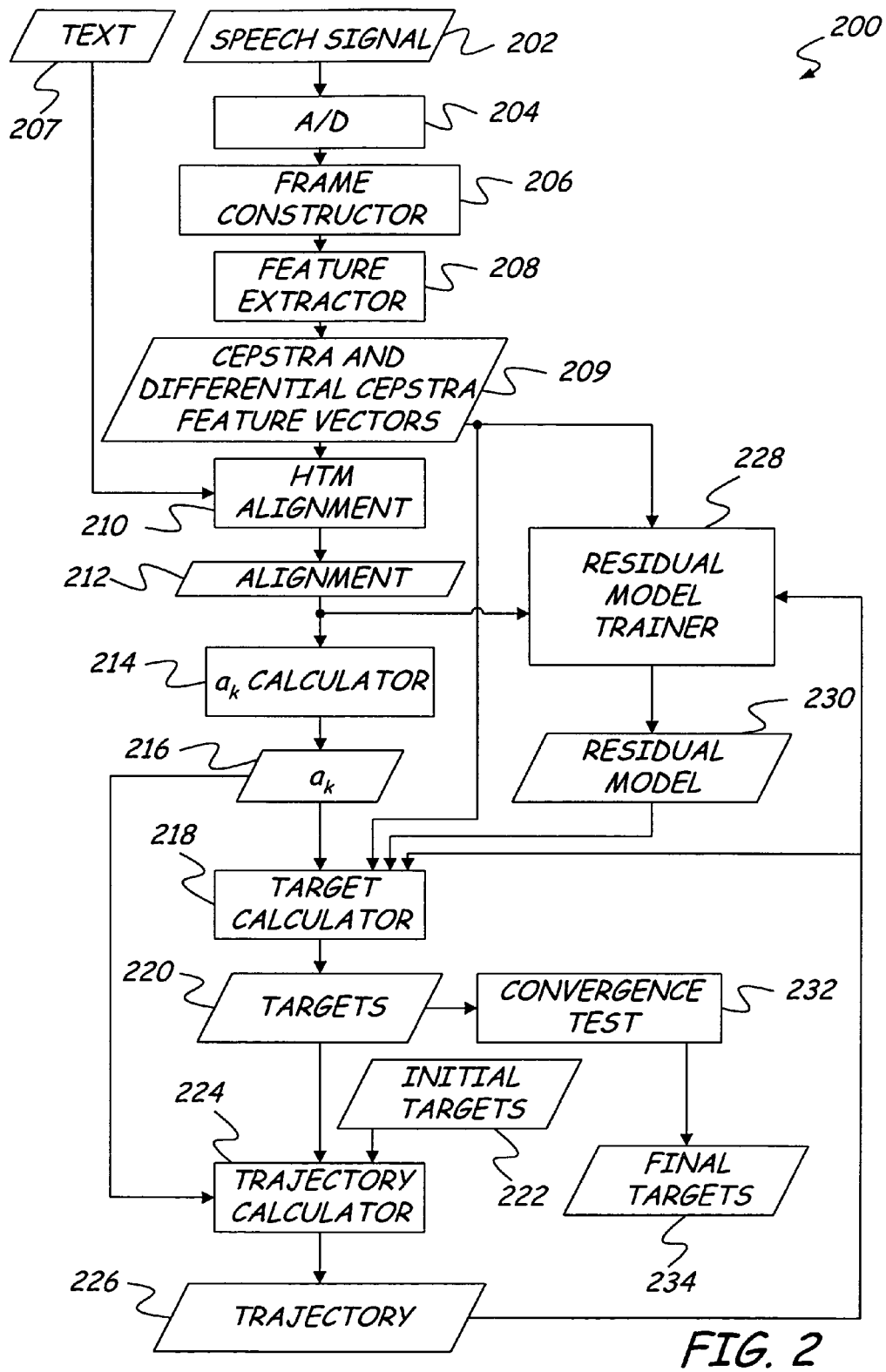
FIG. 2 depicts a block diagram for a software system for implementing speech recognition training, according to an illustrative embodiment.
Figure 3:
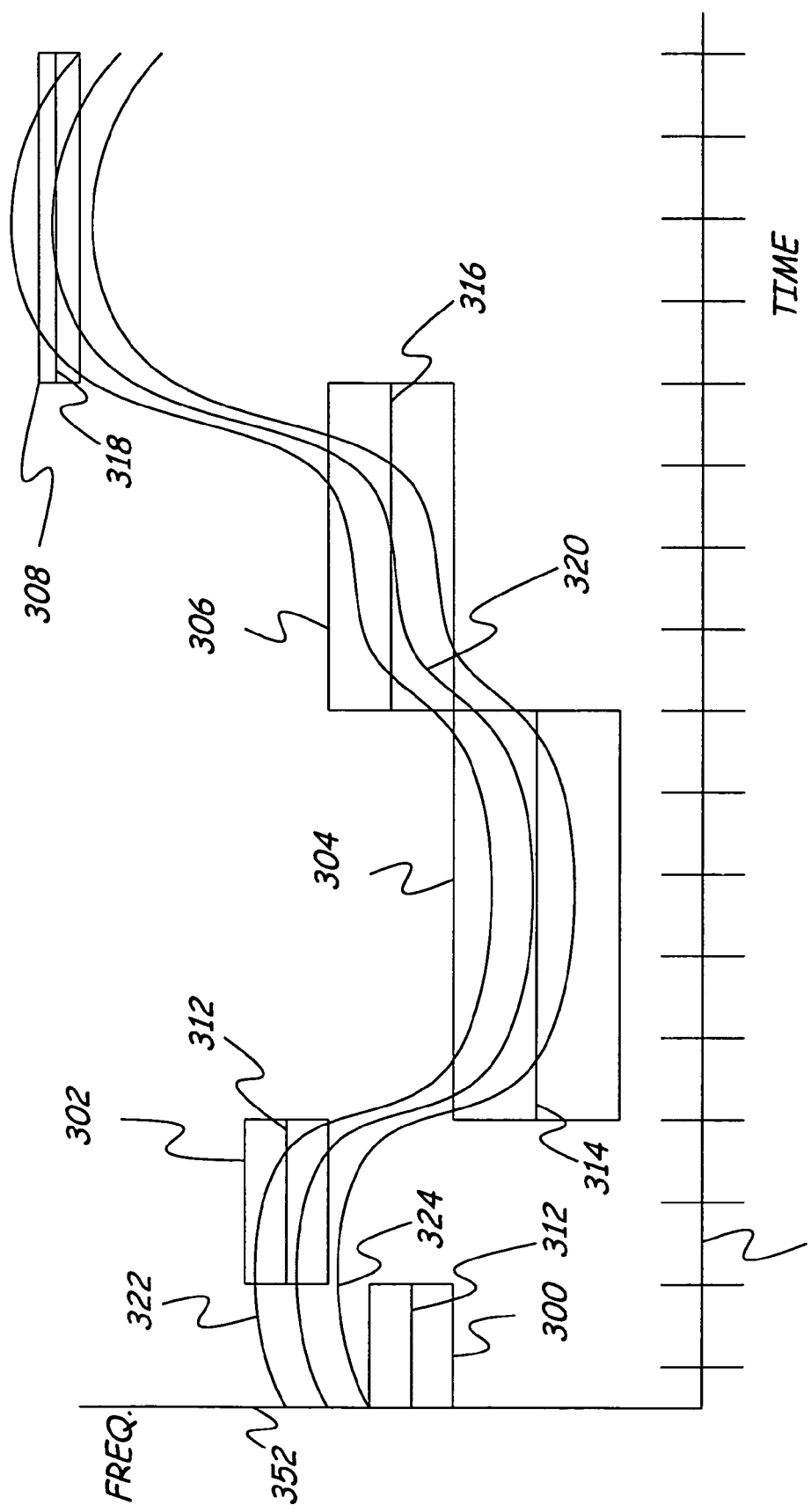
FIG. 3 depicts a graph showing trajectories and targets for vocal tract resonances used for speech recognition training, according to an illustrative embodiment.

Making reference to FIGS. 1 and 2, method 100 begins with step 102, in which a speech signal 202 generated by a trainer reading from a text 204 is received by an analog-to-digital (A/D) converter 206. At step 104, the speech signal is converted into digital frames by converting the analog signal into digital samples using A/D converter 204 and forming frames of digital samples using frame constructor 206. At step 106, the frames derived from the speech signal are used to form observed feature vectors 209 for each frame using feature extractor 208. In one illustrative embodiment, A/D converter 204 samples the analog speech signal at 16 kHz with 16 bits per sample, thereby creating 32 kilobytes of speech data per second and frame constructor 206 creates a new frame every 10 milliseconds that includes 25 milliseconds worth of data, for example. Under various embodiments, feature extractor 208 may extract observed feature vectors 209 as linear predictive coding (LPC) cepstral feature vectors, perceptual linear prediction (PLP) cepstral feature vectors, mel frequency cepstra feature vectors, fast Fourier transform (FFT) feature vectors, or other types of vectors, for example.

At step 108, observed cepstra and differential cepstra feature vectors 209 are aligned with speech units by a hidden trajectory model (HTM) alignment component 210. HTM alignment component 210 uses a dictionary (not shown) to divide text 202 into speech units. It then aligns the sequences of observed cepstra and differential cepstra feature vectors 209 with the speech units using a hidden trajectory model (not shown), which describes the probability of each speech unit given the sequence of observed cepstra and differential cepstra feature vectors 209. This results in an alignment 212 which associates cepstra and differential cepstra feature vectors (and thereby the frames associated with the cepstra and differential cepstra feature vectors) with speech units in the training speech signal.

Method 100 of FIG. 1 continues at step 110 to evaluate cepstra and differential cepstra model parameters, which may be generally labeled as $\alpha_k$, for each frame of the speech signal by model parameter calculator 214. As noted below, the model parameters may be determined using EQ. 5, below, and alignment 212. Once the model parameters 216 have been determined for each frame k, the process continues at step 112 where a conditional distribution is evaluated by a trajectory calculator 224. For example, in an illustrative embodiment, the conditional distribution may be evaluated as a probability density function of the time-ordered observed feature vectors and the time-ordered hidden trajectory vectors, and may be evaluated using the time-ordered hidden trajectory vectors, a parameter-free prediction function acting on the time-ordered observed cepstra and differential cepstra trajectory vectors, and vector and matrix differential cepstra parameters, as in EQ. 9, below.

At step 112, trajectory calculator 224 produces trajectory 226, representing a conditional distribution of the cepstra and differential cepstra trajectory vectors, using initial targets 222, which in one embodiment are generally accepted values for the vocal tract resonances for the various speech units. Trajectory calculator 224 calculates the mean trajectory by applying filter parameters 216 and initial targets 222, as $\mu_T$, to EQ. 5 below. The resulting mean trajectory is taken as trajectory 226.

At step 114, a residual model 230 is trained by a residual model trainer 228 using trajectory 226. Residual model 230 is trained by taking the difference between observed cepstra and differential cepstra feature vectors 209 and cepstra and differential cepstra feature vectors predicted using the corresponding value of trajectory 226.

This may be described with the equation:

$$r = o_k - F[z_k] \quad (EQ. 1)$$

where r is the residual and $o_k$ is the observed cepstra feature vector for the kth frame. The residuals, r, are grouped by speech units, and the mean and covariance for each group are computed to produce the residual model ($\mu_{s(k)}, \Sigma_{s(k)}$) 230. Differentials between time-ordered cepstra may also be used for acoustic features, and combined with the cepstra features for that purpose; these are discussed in more detail further below, after the description of the system using the cepstra alone.

At step 116, means are determined for the targets; residual model 230 is provided to a target calculator 218 along with observed cepstra and differential cepstra feature vectors 209, filter parameters 216, and trajectory 226. Target calculator 218 determines the mean vocal tract resonance target vectors 220 of each speech unit, as elaborated further below.

At step 118, the mean target vectors are assessed by a convergence test 232 to determine if the values have converged. If they have not converged, the mean target vectors are provided to trajectory calculator 224, which uses the mean target vectors in EQ. 5 below to re-evaluate the distribution of cepstra and differential cepstra features and determine a new sequence of trajectories 226 at step 120. The new trajectory values are then used to retrain residual model 230 at step 114 as described above. The new residual model and the new trajectories are then used to recalculate the mean target vectors at step 116.

Steps 118, 120, 112, and 114 may be repeated iteratively until the mean target vectors converge at step 118. When the mean target vectors converge, the mean target vectors are set as the final targets 234, and the process may end at step 122, where the method 100 is finished with training the speech recognition model using differential cepstra, and ready to receive subsequent speech signals and provide outputs based on interpretations of the speech signals.

Under one embodiment, the first stage of the hidden trajectory model describes the vocal tract resonance trajectory as being generated from segmental targets applied to a bi-directional finite impulse response filter as:

$$z_k^s = h_k^s * t_k = \sum_{\tau=k-D}^{k+D} c_\gamma \gamma_{s(\tau)}^{|k-\tau|} t_{s(\tau)} \quad (EQ. 2)$$

where $z_k^s$ is the trajectory in the kth time frame for speech unit s, $t_{s(\tau)}$ is the VTR target vector for speech unit s at time frame $\tau$, $\gamma_{s(\tau)}$ is a coarticulation parameter that indicates the spatial extent of coarticulation and is correlated with speaking effort, and 2D+1 represents the length of the filter's impulse response $h_{s(k)}$ and determines the temporal extent of coarticulation. In one illustrative embodiment, the coarticulation parameter $\gamma_{s(\tau)}$ may have a value of 0.6 for all speech units s, for example.

Under one embodiment, the speech unit-dependent target vector $t_s$ in EQ. 2 is assumed to be a random vector with a Gaussian distribution:

$$p(t|s) = N(t; \mu_{Ts}, \Sigma_{Ts}) \quad (EQ. 3)$$

where $\mu_{Ts}$ is the mean of the target vector and $\Sigma_{Ts}$ is the variance of the target vector, which in many embodiments may be assumed to be diagonal. Under one embodiment, the model tracks the frequency and bandwidth of four vocal tract resonances. Under such an embodiment, the mean contains eight components such that $\mu_{Ts} = \{f_1\ f_2\ f_3\ f_4\ b_1\ b_2\ b_3\ b_4\}$, where $f_x$ represents a target frequency and $b_x$ represents a corresponding target bandwidth for a vocal tract resonance.

Due to the linearity between z and t shown in EQ. 2, the assumption that the target vector is a Gaussian leads to the VTR trajectory also being a Gaussian, such that:

$$p(z_k|s) = N[z_k; \mu_{z_k}, \Sigma_{z_k}] \quad (EQ. 4)$$

Combining EQS. 2, 3, and 4, the mean vector of the Gaussian distribution for the vocal tract resonance trajectory z(k) is derived as:

$$\mu_{z_k} = \sum_{\tau=k-D}^{k+D} c_\gamma \gamma_{s(\tau)}^{|k-\tau|} \mu_{Ts(\tau)} = a_k \cdot \mu_T \quad (EQ. 5)$$

where the right hand side of EQ. 5 represents the dot product of filter parameter vector $\alpha_k$ and matrix $\mu_T$, $\alpha_k$ is a filter parameter vector with individual elements of the vector consisting of equations, and $\mu_T$ is a matrix of target means, with a separate row for each speech unit that can be observed during recognition and a separate column for each component of the target vector. In one embodiment, 58 different speech unit components, such as phonemes, may be used, for example. This may be representative of a number of identified phonemes assigned to the phonemes used in a particular human language, according to its standard dialect and pronunciation. For example, Chinese has 58 standard phonemes, and Ukrainian and Lithuanian also happen to have 58 standard phonemes. Other natural human languages have anywhere from fewer than a dozen to over 100 phonemes. Any of these numbers of phoneme components, or any number of any type of speech segments, may be used as components for the target means in various embodiments.

FIG. 3 depicts a graph showing trajectories and targets for vocal tract resonances used for speech recognition training, according to an illustrative embodiment. In particular, FIG. 3 illustratively depicts a relationship between the VTR trajectory distributions and the target vector distributions for a single vocal tract resonance frequency, in accordance with this illustrative embodiment.

In FIG. 3, time is shown along horizontal axis 350 and frequency is shown along vertical axis 352. FIG. 3 shows five target distributions 300, 302, 304, 306 and 308, represented as boxes, having target means 310, 312, 314, 316 and 318 respectively. In FIG. 3, the height of each box representing a target vector distribution provides an indication of the variance of the distribution. Based on the bi-directional filtering of EQ. 5, the mean for the vocal tract resonance trajectory follows the path 320 and has a variance as indicated by the vertical distance between upper band 322 and lower band 324.

Referring again to EQ. 5, there is no explicit expression for the filter parameter vector $\alpha_k$ in the equation. Instead, each $\alpha_k$ can be constructed based on the ordering and identity of the phones, phonemes, or other speech segments in the sequence in the speech signal, in this illustrative embodiment. Specifically, each $\alpha_k$ may be generated based on an alignment of training speech data with text. This alignment indicates which target means $\mu_{T_s}$ and smoothing parameters $\gamma_s$ are used to determine the current trajectory mean in EQ. 5. Using these alignments, the values of $\alpha_k$ can be determined through an algorithm. For example, if instead of using 58 speech units, 5 speech units were used, with the following form:

$$\mu_T = \begin{bmatrix} \mu_T(1) \\ \mu_T(2) \\ \mu_T(3) \\ \mu_T(4) \\ \mu_T(5) \end{bmatrix} \quad \text{(EQ. 6)}$$

and the training showed an alignment between speech units and time frames k as follows:

TABLE 1

| | Speech Unit | | |
|---|---|---|---|
| | 1 | 2 | 4 |
| Frame (k) | 1 2 | 3 | 4 5 6 |

The following values for the filter parameters $\alpha_k$ would then be obtained:

$$a_1 = [\, c + c\gamma_1 \quad c\gamma_2^2 \quad 0 \quad c\gamma_4^3 \quad 0 \,]$$
$$a_2 = [\, c\gamma_1 + c \quad c\gamma_2 \quad 0 \quad c\gamma_4^2 + c\gamma_4^3 \quad 0 \,]$$
$$a_3 = [\, c\gamma_1^2 + c\gamma_1 \quad c \quad 0 \quad c\gamma_4 + c\gamma_4^2 + c\gamma_4^3 \quad 0 \,]$$
$$a_4 = [\, c\gamma_1^3 + c\gamma_1^2 \quad c\gamma_2 \quad 0 \quad c + c\gamma_4 + c\gamma_4^2 \quad 0 \,]$$
$$a_5 = [\, c\gamma_1^3 \quad c\gamma_2^2 \quad 0 \quad c\gamma_4 + c + c\gamma_4 \quad 0 \,]$$
$$a_6 = [\, 0 \quad c\gamma_2^3 \quad 0 \quad c\gamma_4^2 + c\gamma_4 + c \quad 0 \,]$$

where a filter size of D=3 has been used and each filter parameter vector contains five elements. Using EQ. 5 above, each fth component of $\mu_{z_k}$ is:

$$\mu_{z_k}(f) = \sum_{l=1}^{L} a_k(l)\mu_T(l, f) \quad \text{(EQ. 7)}$$

where l is an index for the speech units, L is the total number of speech units available in the language, such as 58 phoneme speech units as illustratively introduced above, and f is an index into the frequency and bandwidth components of the target vector.

Similarly, the covariance matrix in EQ. 4 can be similarly derived as:

$$\sum_{z_k} = \sum_{\tau=k-D}^{k+D} c_\gamma^2 \gamma_{s(\tau)}^{2|k-\tau|} \sum_{T_{s(\tau)}} \quad \text{(EQ. 8)}$$

Approximating the covariance matrix by a diagonal matrix for each speech unit l, the elements of the diagonal are represented a vector:

$$\sigma_{z_k}^2 = v_k \cdot \sigma_T^2 \quad \text{(EQ. 9)}$$

where the target covariance matrix is also approximated as diagonal:

$$\sum_T(l) \approx \begin{bmatrix} \sigma_T^2(l, 1) & 0 & \cdots & 0 \\ 0 & \sigma_T^2(l, 2) & \cdots & 0 \\ \vdots & \vdots & \ddots & \vdots \\ 0 & 0 & \cdots & \sigma_T^2(l, 8) \end{bmatrix} \quad \text{(EQ. 10)}$$

with the fth element of the vector in EQ. 9 being:

$$\sigma_{z_k}^2(f) = \sum_{l=1}^{L} v_k(l)\sigma_T^2(l, f) \quad \text{(EQ. 11)}$$

In EQ. 7 and EQ. 11, $\alpha_k$ and $v_k$ are frame-dependent k vectors that are both a function of the speech unit identities and temporal orders in the speech signal but that are independent of the vocal tract resonance dimension.

The second stage of the Hidden Trajectory Model provides a probabilistic mapping from the stochastic Vocal Tract Resonance (VTR) hidden trajectory $z_k$ to a stochastic observation trajectory $o_k$, as functions of a time frame k, such that the mapping provides the probability of an observed vector given a hidden trajectory value. Under one embodiment, the observation trajectory takes the form of linear predictive coding (LPC) cepstra and the mapping uses a fixed, parameter-free, non-linear prediction function $F[z_k]$, and a Gaussian residual model $(\mu_{s(k)}, \Sigma_{s(k)})$ where $\mu_{s(k)}$ is the mean vector and $\Sigma_{s(k)}$ is the covariance matrix, respectively, of the residual model. In one particular embodiment, the mapping provides a conditional distribution of cepstra as a Gaussian distribution:

$$p(o_k|z_k,s) = N[o_k; F[z_k] + \mu_{s(k)}, \Sigma_{s(k)}] \quad \text{(EQ. 12)}$$

where the prediction function $F[z_k]$ is provided as:

$$F_n[z(k)] = \frac{2}{n} \sum_{p=1}^{P} e^{-\pi n \frac{b_{p_k}}{f_s}} \cos\left(2\pi n \frac{f_{p_k}}{f_s}\right) \quad \text{(EQ. 13)}$$

which gives the value of $F[z_k]$ for the nth LPC cepstral order, where $f_s$ is the sampling frequency of the speech signal, $f_p$ is a VTR frequency, $b_p$ is a corresponding VTR bandwidth, and P is the number of VTR frequencies. $\mu_{s(k)}$ and $\Sigma_{s(k)}$ are the model parameters, related to the cepstral prediction residual component, subject to optimization from the cepstral observation trajectory data $o_k$.

The prior distribution of $z_k$ for each time frame k given a phonetic unit or state s can be modeled as a Gaussian distribution:

$$p(z_k|s) = N(z_k; \mu_{z_k}, \Psi_{z_k}) \quad \text{(EQ. 14)}$$

Here, the mean vector $\mu_{z_k}$ and the covariance matrix $\Psi_{z_k}$ are dependent on the underlying model parameters representing the phonetic targets and on the coarticulatory properties of the stochastic target-directed "hidden" speech dynamics.

To compute the acoustic likelihood $p(o_k|s)$, the hidden variable $z_k$ may be marginalized to obtain the following:

$$p(o_k|s) = \int p(o_k|z_k,s) p(z_k,s) dz_k \quad \text{(EQ. 15)}$$

Substituting from the equations above renders this as:

$$p(o_k|s) = \int N(o_k; F[z_k] + \mu_{s(k)}, \Sigma_{s(k)}) N(z_k; \mu_{z_k}, \Psi_{z_k}) dz_k \quad \text{(EQ. 16)}$$

For computational tractability, it may be desirable to linearize the non-linear prediction function $F[z_k]$. Under one embodiment, this may be accomplished using a first order vector Taylor series expansion, such that:

$$F_n[z_k] \approx F_n[z_k^0] + F_n'[z_k^0](z_k - z_k^0) \quad \text{(EQ. 17)}$$

where $z_k^0$ is the Taylor series expansion point, which may be obtained by a high-quality VTR or formant tracker, in an illustrative embodiment, and where $F_n'[z_k^0]$ is the derivative of $F_n[z_k^0]$ with respect to a VTR dimension, such that:

$$F_n'[f_{p_k}] = \frac{\delta F_n[z_k^0]}{\delta f_{p_k}} = -\frac{4\pi}{f_s} e^{-\pi n \frac{b_{p_k}}{f_s}} \sin\left(2\pi n \frac{f_{p_k}}{f_s}\right) \quad \text{(EQ. 18)}$$

for the pth VTR frequency component of z, and:

$$F_n'[b_{p_k}] = \frac{\delta F_n[z_k^0]}{\delta b_{p_k}} = -\frac{2\pi}{f_s} e^{-\pi n \frac{b_{p_k}}{f_s}} \cos\left(2\pi n \frac{f_{p_k}}{f_s}\right) \quad \text{(EQ. 19)}$$

for the pth VTR bandwidth component of z. In other embodiments, Taylor series of other orders may be applied, or altogether different estimation tools may be used to approximate the prediction function $F[z_k]$ to the desired combination of accuracy and computing efficiency.

With the approximation of $F[z_k]$ in hand, the acoustic likelihood $p(o_k|s)$ may be estimated as follows:

$$p(o_k|s) \approx N(o_k; F'[z_k^0]\mu_{z_k} + b_k, \Omega_k) \quad \text{(EQ. 20)}$$

where:

$$b_k = F[z_k^0] + \mu_{s(k)} - F'[z_k^0]z_k^0 \quad \text{(EQ. 21)}$$

$$\Omega_k = \Sigma_{s(k)} + F'[z_k^0]\Psi_{z_k}(F'[z_k^0])^T \quad \text{(EQ. 22)}$$

$\mu_s$ and $\Sigma_s$ are cepstral prediction residual parameters that may be used in the learning algorithm.

As described above, the Hidden Trajectory Model (HTM) uses cepstra as static observation vectors. This can be generalized so that the HTM accounts jointly for the cepstra and their time-ordered differentials, according to various embodiments. The differential cepstra, which can also be referred to as delta cepstra, may be defined in one illustrative embodiment as $d_k$ according to the following:

$$d_k = \frac{o_{k+\theta} - o_{k-\theta}}{2\theta} \quad \text{(EQ. 23)}$$

The differential cepstra are therefore evaluated as a function of a difference between a first cepstral observation trajectory, $o_{k-\theta}$, and a subsequent second cepstral observation trajectory, $o_{k+\theta}$ from a time-ordered series of cepstral observation trajectories. Here, k can be thought of as a reference time, with a time interval $\theta$ before the reference time k and the same time interval $\theta$ after the reference time k. The difference between the two time-ordered cepstral observation trajectories is divided by two times the time interval $\theta$, so that the differential cepstra $d_k$ are defined for interval-weighted differences. This formulation of differential cepstra $d_k$ may be used in lieu of the cepstral observation trajectory vectors $o_k$ in (EQ. 12), which can also be modified to account for a time-ordered sequence of VTR hidden trajectory vectors $z_k$ corresponding to the time sequence represented by the differential cepstra $d_k$, to obtain a conditional distribution of differential cepstra, as:

$$p[d_k | z_k, z_{k+\theta}, z_{k-\theta}, s] = \quad \text{(EQ. 24)}$$

$$N\left[d_k; \frac{F[z_{k+\theta}] - F[z_{k+\theta}]}{2\theta} + \delta_{s(k)}, \Gamma_{s(k)}\right]$$

where $\delta_{s(k)}$ is a vector-valued parameter analogous to a mean for the differential cepstra and $\Gamma_{s(k)}$ is a matrix-valued parameter analogous to a covariance matrix for the differential cepstra.

(EQ. 24) can then be joined with (EQ. 12) to identify the joint conditional distribution of the cepstra and differential cepstra features, according to one illustrative embodiment for performing steps 112 and 120 of method 100 in FIG. 1, as described above. The joint conditional distribution is:

$$p[o_k, d_k | z_k, z_{k+\theta}, z_{k-\theta}, s] = \quad \text{(EQ. 25)}$$

$$N\left(\begin{bmatrix} o_k \\ d_k \end{bmatrix}; \begin{bmatrix} F[z_k] + \mu_{s(k)} \\ \frac{F[z_{k+\theta}] - F[z_{k+\theta}]}{2\theta} + \delta_{s(k)} \end{bmatrix}\right),$$

-continued $$\begin{bmatrix} \Sigma_{s(k)} & 0 \\ 0 & \Gamma_{s(k)} \end{bmatrix}$$

A variety of different methods for approximating or otherwise evaluating the joint conditional distribution $p[o_k, d_k | z_k, z_{k+\theta}, z_{k-\theta}, s]$ can be applied in different embodiments. According to one illustrative embodiment, the joint conditional distribution can be evaluated using a first-order Taylor series approximation for the non-linear function $F[z_k]$ as shown in (EQ. 17) above, as provided as follows, with some terms consolidated as shown:

$$p[o_k, d_k | z_k, z_{k+\theta}, z_{k-\theta}, s] \approx$$

$$N\left(\begin{bmatrix} o_k \\ d_k \end{bmatrix}; A_k \begin{bmatrix} z_k \\ z_{k+\theta} \\ z_{k-\theta} \end{bmatrix} + b_k, \begin{bmatrix} \Sigma_{s(k)} & 0 \\ 0 & \Gamma_{s(k)} \end{bmatrix}\right)$$

where the consolidated terms represent:

$$A_k = \begin{bmatrix} F'[z_k^0] & 0 & 0 \\ 0 & \frac{F'[z_{k+\theta}^0]}{2\theta} & -\frac{F'[z_{k-\theta}^0]}{2\theta} \end{bmatrix} \quad \text{(EQ. 27)}$$

and:

$$b_k = \quad \text{(EQ. 28)}$$

$$\begin{bmatrix} F[z_k^0] + \mu_{s(k)} - F'[z_k^0]z_k^0 \\ \frac{F[z_{k+\theta}^0] - F'[z_{k+\theta}^0]z_{k+\theta}^0 - F[z_{k-\theta}^0] + F'[z_{k-\theta}^0]z_{k-\theta}^0}{2\theta} + \delta_{s(k)} \end{bmatrix}$$

The cepstra/differential cepstra joint hidden trajectory vector may further be assumed to have a block-diagonal Gaussian distribution, as:

$$p[z_k, z_{k+\theta}, z_{k-\theta} | s] = \quad \text{(EQ. 29)}$$

$$N\left(\begin{bmatrix} z_k \\ z_{k+\theta} \\ z_{k-\theta} \end{bmatrix}; \begin{bmatrix} \mu_{z_k} \\ \mu_{z_{k+\theta}} \\ \mu_{z_{k-\theta}} \end{bmatrix}, \begin{bmatrix} \Psi_{z_k} & 0 & 0 \\ 0 & \Psi_{z_{k+\theta}} & 0 \\ 0 & 0 & \Psi_{z_{k-\theta}} \end{bmatrix}\right)$$

where $\Psi_{z_k}$, $\Psi_{z_{k+\theta}}$, and $\Psi_{z_{k-\theta}}$ are the covariances of the hidden trajectory vectors at three different time-ordered frames. They are determined by the VTR-targets' covariance parameters of the HTM and by the coarticulation properties of the VTR dynamics, and may be considered fixed for purposes of the cepstral prediction residual parameters.

The acoustic likelihood, $p(o_k, d_k | s)$, may then be computed by marginalizing the hidden trajectory variables, as:

$$p(o_k, d_k | s) = \iiint p(o_k, d_k | z_k, z_{k+\theta}, z_{k-\theta}, s) p(z_k, z_{k+\theta}, z_{k-\theta} | s) \, dz_k \, dz_{k+\theta} \, dz_{k-\theta} \quad \text{(EQ. 30)}$$

This integration has a closed form, which yields an acoustic likelihood of:

$$p(o_k, d_k | s) = N\left(\begin{bmatrix} o_k \\ d_k \end{bmatrix}; A_k \begin{bmatrix} \mu_{z_k} \\ \mu_{z_{k+\theta}} \\ \mu_{z_{k-\theta}} \end{bmatrix} + b_k, \Omega_k\right) \quad \text{(EQ. 31)}$$

where the covariance matrix can be shown to be:

$$\Omega_k = \begin{bmatrix} \Sigma_{s(k)} & 0 \\ 0 & \Gamma_{s(k)} \end{bmatrix} + A_k \begin{bmatrix} \Psi_{z_k} & 0 & 0 \\ 0 & \Psi_{z_{k+\theta}} & 0 \\ 0 & 0 & \Psi_{z_{k-\theta}} \end{bmatrix} A_k^T \quad \text{(EQ. 32)}$$

such that the covariance matrix is enlarged from its value in the joint conditional likelihood distribution of EQ. 25, above.

The acoustic likelihood, $p(o_k, d_k | s)$, provided by EQ. 31, using joint cepstra and the time-ordered differentials of the cepstra as the acoustic features, provides a principled and advantageous generalization over using only static cepstra as the acoustic features. The quantity $A_k = F'[z_k^0]$ from EQ. 15 in the static cepstra only model is generalized in EQ. 27 with a higher dimension, and the quantity $b_k$ from EQ. 15 in the static cepstra only model is also generalized with a higher dimension, in (EQ. 28). An analogous expansion can be identified for the time-varying covariance matrix $\Omega_k$. These functions of the intrinsic parameters may be computed, and therefore the likelihood computed, using the intrinsic parameters derived from the training data. The intrinsic parameters, according to one illustrative embodiment, include $\mu_s$, $\Sigma_s$, $\delta_s$, and $\Gamma_s$, which may be estimated in the generalized Hidden Trajectory Model using maximum likelihood, an illustration of which is elaborated as follows.

It may be assumed that the boundaries of each phone unit, denoted by s, are given, either provided by a database, or computed from a Hidden Markov Model system in advance. According to an illustrative embodiment, the model parameter calculator 214 from the system 200 of FIG. 2 may compute the derivatives of the logarithmic products of the acoustic likelihood, $p(o_k, d_k | s)$, over all frames in the training data, with respect to the vector-valued parameters $\mu_s$ and $\delta_s$, which are related to mean vectors of cepstral prediction residuals. Setting the derivatives to zero and solving for the parameters, closed-form estimation formulas yield estimated parameters as follows:

$$\hat{\mu}_s = \frac{1}{K_s} \sum_{k=1}^{K_s} (o_k - F[z_k^0] - F'[z_k^0](\mu_{z_k} - z_k^0)) \quad \text{(EQ. 33)}$$

$$\hat{\delta}_s = \quad \text{(EQ. 34)}$$

$$\frac{1}{K_s} \sum_{k=1}^{K_s} \left[ d_k - \frac{1}{2\theta}(F[z_{k+\theta}^0] + F'[z_{k+\theta}^0](\mu_{z_{k+\theta}} - z_{k+\theta}^0) - F[z_{k-\theta}^0] - F'[z_{k-\theta}^0](\mu_{z_{k-\theta}} - z_{k-\theta}^0)) \right]$$

where $K_s$ is the total number of frames associated with a phone unit s in the training data.

For estimating the parameters $\Sigma_s$ and $\Gamma_s$, covariance matrices of cepstral prediction residuals, closed-form estimation formulas may not be available. In the present illustrative embodiment, estimating these parameters may be simplified by assuming diagonality for the parameters, and estimating their diagonal elements. A frame-independent approximation may also be used, with an approximate estimation formula generalized for joint cepstra and differential cepstra features:

$$diag(\hat{\Sigma}_s) \approx \qquad \text{(EQ. 35)}$$
$$\frac{1}{K_s}\sum_{k=1}^{K_s}\left[(o_k - F[z_k^0] - F'[z_k^0](\mu_{z_k} - z_k^0) - \hat{\mu}_s)^2 - diag(F'[z_k^0]\Psi_{z_k}(F'[z_k^0])^T)\right]$$

$$diag(\hat{\Gamma}_s) \approx \qquad \text{(EQ. 36)}$$
$$\frac{1}{K_s}\sum_{k=1}^{K_s}\left\{\left[d_k - \frac{1}{2\theta}(F[z_{k+\theta}^0] + F'[z_{k+\theta}^0](\mu_{z_{k+\theta}} - z_{k+\theta}^0) - F[z_{k-\theta}^0] - F'[z_{k-\theta}^0](\mu_{z_{k-\theta}} - z_{k-\theta}^0)) - \hat{\delta}_s\right]^2 - diag\left(A_k \begin{bmatrix} \Psi_{z_k} & 0 & 0 \\ 0 & \Psi_{z_{k+\theta}} & 0 \\ 0 & 0 & \Psi_{z_{k-\theta}} \end{bmatrix} A_k^T\right)\right\}$$

Here, the vector square operations are element-by-element ones.

Figure 4:
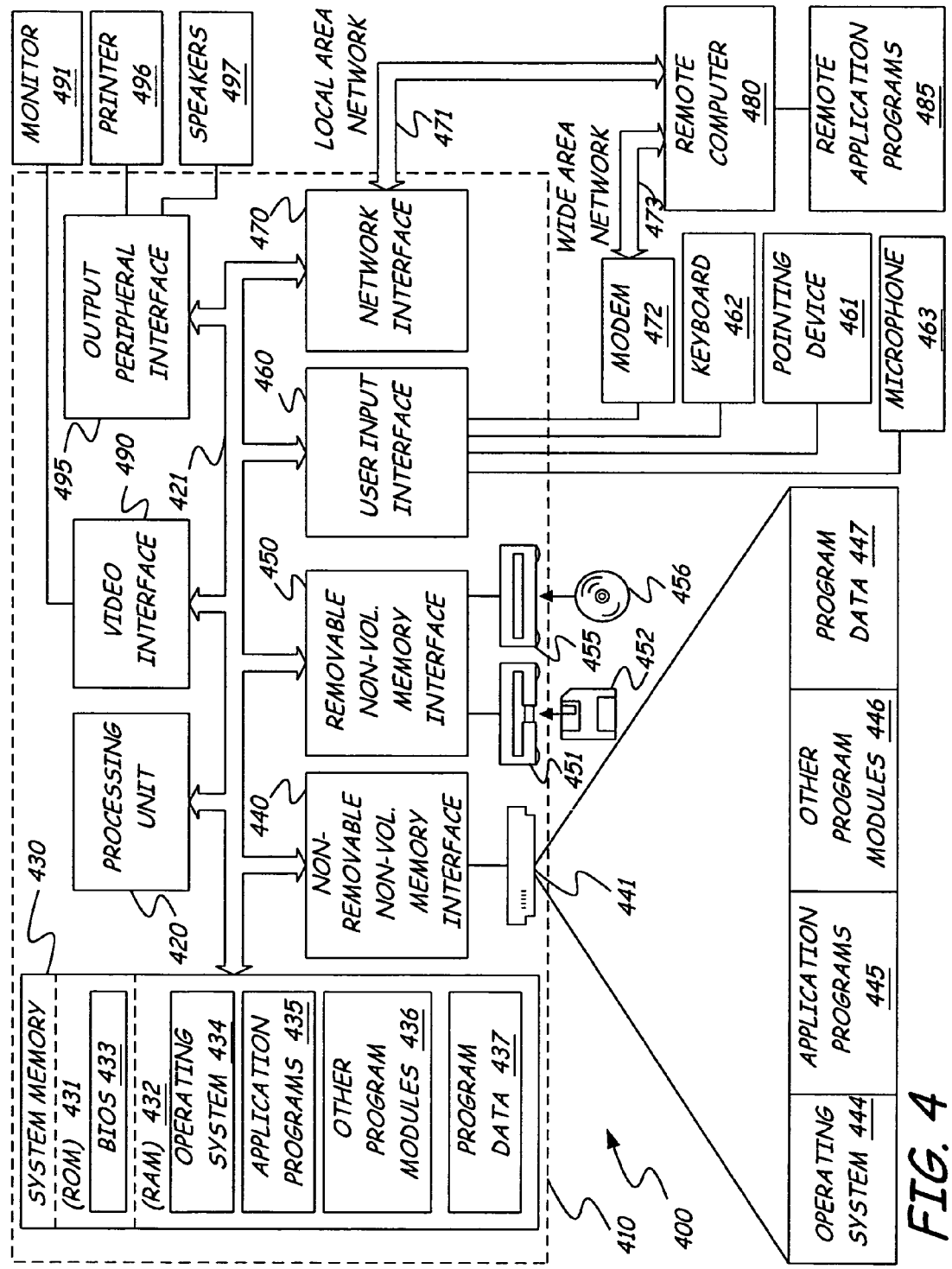
FIG. 4 depicts a block diagram of one computing environment in which some embodiments may be practiced, according to an illustrative embodiment.

FIG. 4 illustrates an example of a suitable computing system environment 400 on which various embodiments may be implemented. For example, various embodiments may be implemented as software applications, modules, or other forms of instructions that are executable by computing system environment 400 and that configure computing system environment 400 to perform various tasks or methods involved in different embodiments. A software application or module associated with an illustrative implementation of a speech recognition system using hidden trajectory modeling with differential cepstra may be developed in any of a variety of programming or scripting languages or environments. For example, it may be written in C#, F#, C++, C, Pascal, Visual Basic, Java, JavaScript, Delphi, Eiffel, Nemerle, Perl, PHP, Python, Ruby, Visual FoxPro, Lua, or any other programming language. It is also envisioned that new programming languages and other forms of creating executable instructions will continue to be developed, in which further embodiments may readily be developed.

Computing system environment 400 as depicted in FIG. 4 is only one example of a suitable computing environment for implementing various embodiments, and is not intended to suggest any limitation as to the scope of use or functionality of the claimed subject matter. Neither should the computing environment 400 be interpreted as having any dependency or requirement relating to any one or combination of components illustrated in the exemplary operating environment 400.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices. As described herein, such executable instructions may be stored on a medium such that they are capable of being read and executed by one or more components of a computing system, thereby configuring the computing system with new capabilities.

With reference to FIG. 4, an exemplary system for implementing some embodiments includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable volatile/nonvolatile computer storage media. By way of example and not limitation, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 may be operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 may include a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on remote computer 480. It will be appreciated that the network connections shown are exemplary and other means of establishing a communications link between the computers may be used.

Figure 5:
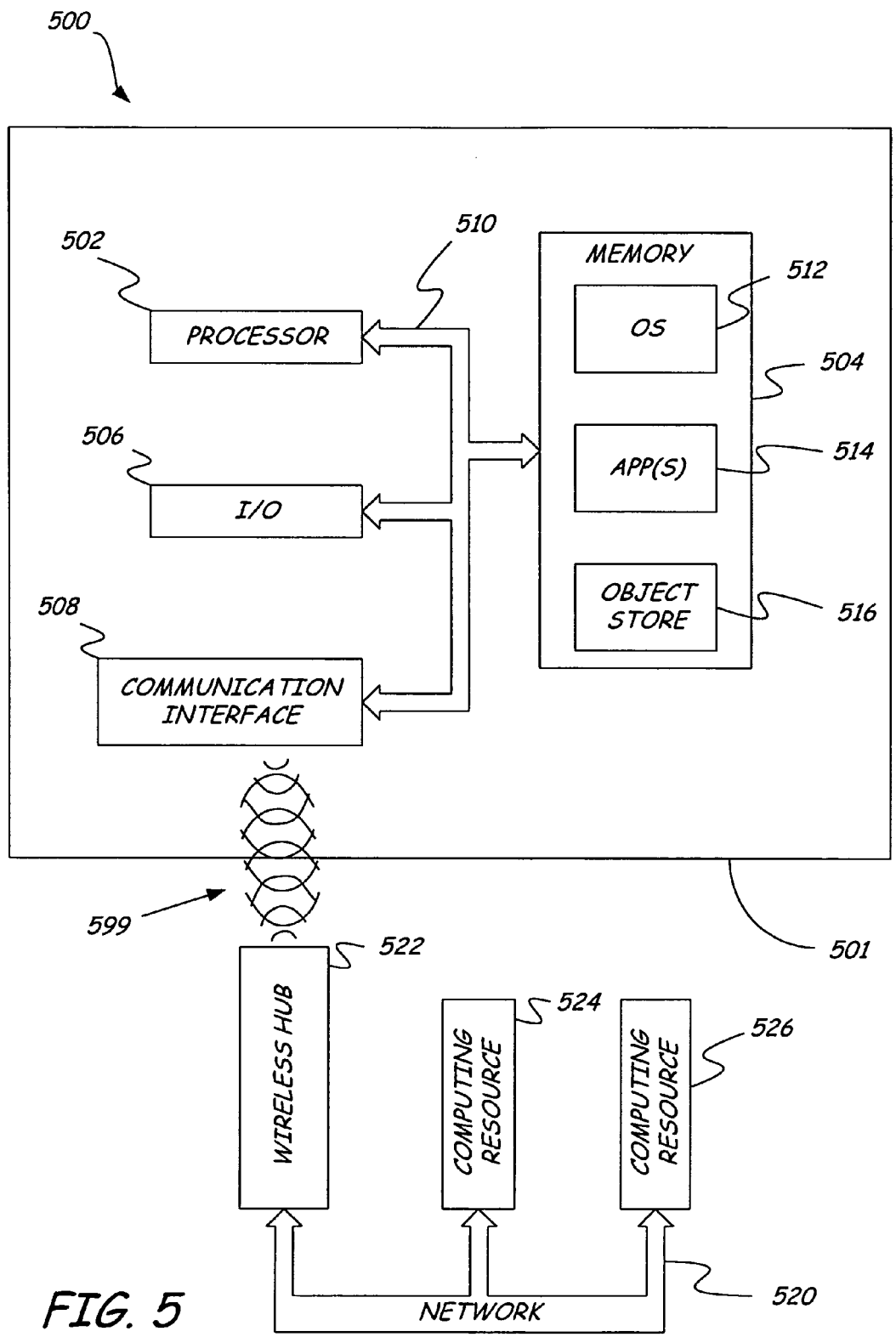
FIG. 5 depicts a block diagram of a mobile computing environment in which some embodiments may be practiced, according to an illustrative embodiment.

FIG. 5 depicts a block diagram of a general mobile computing environment, comprising a mobile computing device and a medium, readable by the mobile computing device and comprising executable instructions that are executable by the mobile computing device, according to another illustrative embodiment. FIG. 5 depicts a block diagram of a mobile computing system 500 including mobile device 501, according to an illustrative embodiment. Mobile device 501 includes a microprocessor 502, memory 504, input/output (I/O) components 506, and a communication interface 508 for communicating with remote computers or other mobile devices. In one embodiment, the aforementioned components may be coupled for communication with one another over a suitable bus 510.

Memory 504 is implemented as non-volatile electronic memory such as random access memory (RAM) with a battery back-up module (not shown) such that information stored in memory 504 is not lost when the general power to mobile device 500 is shut down. A portion of memory 504 is illustratively allocated as addressable memory for program execution, while another portion of memory 504 is illustratively used for storage, such as to simulate storage on a disk drive.

Memory 504 includes an operating system 512, application programs 514 as well as an object store 516. During operation, operating system 512 is illustratively executed by processor 502 from memory 504. Operating system 512, in one illustrative embodiment, is a WINDOWS® CE brand operating system commercially available from Microsoft Corporation. Operating system 512 is illustratively designed for mobile devices, and implements database features that can be utilized by applications 514 through a set of exposed application programming interfaces and methods. The objects in object store 516 are maintained by applications 514 and operating system 512, at least partially in response to calls to the exposed application programming interfaces and methods.

Communication interface 508 represents numerous devices and technologies that allow mobile device 500 to send and receive information. The devices include wired and wireless modems, satellite receivers and broadcast tuners to name a few. Mobile device 500 can also be directly connected to a computer to exchange data therewith. In such cases, communication interface 508 can be an infrared transceiver or a serial or parallel communication connection, all of which are capable of transmitting streaming information.

Input/output components 506 include a variety of input devices such as a touch-sensitive screen, buttons, rollers, and a microphone as well as a variety of output devices including an audio generator, a vibrating device, and a display. The devices listed above are by way of example and need not all be present on mobile device 500. In addition, other input/output devices may be attached to or found with mobile device 500.

Mobile computing system 500 also includes network 520. Mobile computing device 501 is illustratively in wireless communication with network 520—which may be the Internet, a wide area network, or a local area network, for example—by sending and receiving electromagnetic signals 599 of a suitable protocol between communication interface 508 and wireless interface 522. Wireless interface 522 may be a wireless hub or cellular antenna, for example, or any other signal interface. Wireless interface 522 in turn provides access via network 520 to a wide array of additional computing resources, illustratively represented by computing resources 524 and 526. Naturally, any number of computing devices in any locations may be in communicative connection with network 520. Computing device 501 is enabled to make use of executable instructions stored on the media of memory component 504, such as executable instructions that enable computing device 501 to implement various functions of speech recognition using hidden trajectory modeling with differential cepstra, in an illustrative embodiment.

Figure 6:
FIG. 6 depicts a device implementing a speech recognition application in a usage context, according to an illustrative embodiment.

FIG. 6 depicts a device 600 implementing a speech recognition application in a context of usage by a user 699, according to an illustrative embodiment. Device 600 is a mobile device similar to mobile computing device 501 of FIG. 5, and may include functions of a cell phone, a personal digital assistant, a palmtop computer, a digital audio player, among many other options. Device 600 has an executable application for a speech recognition application that comprises a hidden trajectory model with parameters trained using cepstra and differential cepstra. The application, in this illustrative example, provides a voice user interface that enables general interaction between the user and other applications running on device 600 or accessible over a wireless or other network interface, making use of data stored on device 600 or accessible over a wireless or other network interface, in this illustrative embodiment. Device 600 thereby provides an illustrative example of implementing a capability to receive a speech signal from a user, interpret the speech signal into words using hidden trajectory model training with differential cepstra, and provide a useful output to the user based at least in part on the interpretation of the speech input, in one illustrative embodiment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. As a particular example, while the terms "computer", "computing device", or "computing system" may herein sometimes be used alone for convenience, it is well understood that each of these could refer to any computing device, computing system, computing environment, mobile device, or other information processing component or context, and is not limited to any individual interpretation. As another example, various embodiments may be applied to speech recognition in English, Spanish, Chinese, or any other human language. As another particular example, while many embodiments are presented with illustrative elements that are widely familiar at the time of filing the patent application, it is envisioned that many new innovations in computing technology will affect elements of different embodiments, in such aspects as user interfaces, user input methods, computing environments, and computing methods, and that the elements defined by the claims may be embodied according to these and other innovative advances while still remaining consistent with and encompassed by the elements defined by the claims herein.

What is claimed is:

1. A method comprising:
receiving a speech input;
generating an interpretation of the speech input using hidden trajectory modeling with one or more observation vectors that are based at least in part on cepstra and on differential cepstra derived from the cepstra wherein using the hidden trajectory modeling comprises using prediction functions for the cepstra to estimate a mean for a distribution of target vocal tract resonances, and using prediction functions for the differential cepstra to estimate a vector-valued parameter related to the mean for the distribution of target vocal tract resonances, wherein the prediction functions are applied to time differences of sequential vocal tract resonance trajectories; and
providing an output based at least in part on the interpretation of the speech input.

2. The method of claim 1, wherein the differential cepstra are each evaluated as a function of a difference between a first cepstral observation trajectory and a subsequent second cepstral observation trajectory from a time-ordered series of cepstral observation trajectories.

3. The method of claim 2, wherein the second cepstral observation trajectory is identified for a reference time frame plus a time interval, and the first cepstral observation trajectory is identified for the reference time frame minus the time interval, and the differential cepstra are each evaluated as the second cepstral observation trajectory minus the first cepstral observation trajectory, divided by two times the time interval.

4. The method of claim 1, wherein estimating the vector-valued parameter related to the mean for the distribution of target vocal tract resonances comprises.

5. The method of claim 1, wherein the hidden trajectory modeling comprises probabilistic mapping from interval-weighted differences in sequential stochastic vocal tract resonance trajectories to interval-weighted differences in sequential stochastic observation trajectories.

6. The method of claim 5, wherein the hidden trajectory modeling further comprises iteratively computing distributions of differential cepstra as functions of the probabilistic mapping from the interval-weighted differences in the sequential stochastic vocal tract resonance trajectories to the interval-weighted differences in the sequential stochastic observation trajectories.

7. The method of claim 1, wherein using the hidden trajectory modeling comprises estimating a parameter for covariant matrices of differential cepstral prediction residues.

8. The method of claim 7, wherein estimating the parameter for covariant matrices of differential cepstral prediction residues comprises assuming diagonality for the parameter and estimating its diagonal elements.

9. A computer-readable medium having computer-executable instructions which, when executed by a computing device with a processor, enable the computing device to receive, at the processor, a speech signal and use time-ordered differences in observation trajectory cepstra derived from the speech signal by the processor and time-ordered differences in vocal tract resonance trajectory cepstra derived from the speech signal by the processor to evaluate, with the processor, a probability of an observed value corresponding to a hidden trajectory valuer by evaluating a parameter-free, non-linear prediction function acting on the time-ordered differences in vocal tract resonance trajectory cepstra, and using the prediction function to evaluate a probability of the observed value corresponding to the hidden trajectory value and to output an interpretation of the speech signal based on the probability of the observed value.

10. The computer-readable medium of claim 9, further comprising using the vocal tract resonance trajectory cepstra and the time-ordered differences in the vocal tract resonance trajectory cepstra to estimate a plurality of target vocal tract resonance vector parameters.

11. The computer-readable medium of claim 9, further comprising using the vocal tract resonance trajectory cepstra and the time-ordered differences in the vocal tract resonance trajectory cepstra to estimate a plurality of target vocal tract resonance covariance matrices.

12. The computer-readable medium of claim 9, wherein the prediction function is estimated using a Taylor series approximation.

13. The computer-readable medium of claim 9, further comprising iteratively revising hidden trajectory model parameters and iteratively reevaluating the probability of the observed value corresponding to the hidden trajectory value.

14. The computer-readable medium of claim 9, further comprising iteratively using the probability of the observed value corresponding to the hidden trajectory value for a plurality of observed values and hidden trajectory values to train a speech recognition model, and using the speech recognition model to interpret a speech input and provide an output based at least in part on the interpretation of the speech input.

15. A computer that runs an executable application for a speech recognition application, the speech recognition application comprising a hidden trajectory model with parameters trained using cepstra and differential cepstra, the computer running the speech recognition application to receive a speech signal, use the hidden trajectory model to recognize speech in the speech signal and output the recognized speech.

16. The device of claim 15, wherein the speech recognition application comprises a voice user interface.

* * * * *

UNITED STATES PATENT AND TRADEMARK OFFICE
CERTIFICATE OF CORRECTION

| | | |
|---|---|---|
| PATENT NO. | : 7,805,308 B2 | Page 1 of 1 |
| APPLICATION NO. | : 11/655704 | |
| DATED | : September 28, 2010 | |
| INVENTOR(S) | : Li Deng et al. | |

It is certified that error appears in the above-identified patent and that said Letters Patent is hereby corrected as shown below:

In column 16, line 64, in Claim 9, delete "valuer" and insert -- value --, therefor.

Signed and Sealed this
Tenth Day of May, 2011

David J. Kappos
*Director of the United States Patent and Trademark Office*